(12) United States Patent
Baltes et al.

(10) Patent No.: US 8,335,946 B2
(45) Date of Patent: Dec. 18, 2012

(54) METHOD FOR CENTRALIZATION OF PROCESS SEQUENCE CHECKING

(75) Inventors: Kevin M. Baltes, Wixom, MI (US); Trenton W. Haines, Novi, MI (US)

(73) Assignee: GM Global Technology Operations LLC

( * ) Notice: Subject to any disclaimer, the term of this patent is extended or adjusted under 35 U.S.C. 154(b) by 1507 days.

(21) Appl. No.: 11/285,138

(22) Filed: Nov. 21, 2005

(65) Prior Publication Data

US 2007/0168761 A1 Jul. 19, 2007

(51) Int. Cl.
*G06F 11/00* (2006.01)

(52) U.S. Cl. .......................... 714/39; 714/50

(58) Field of Classification Search ............ 714/39, 714/50

See application file for complete search history.

(56) References Cited

U.S. PATENT DOCUMENTS 3,713,095 A * 1/1973 McPherson ............ 714/50
4,183,462 A * 1/1980 Hideshima et al. ...... 714/50

\* cited by examiner

*Primary Examiner* — Charles Ehne

(57) ABSTRACT

A method for centralization of process sequence checking includes defining a set of steps in a sequence for a process and defining an order of steps in said set of steps. The method includes determining whether one of said steps started independently of others of said steps and determining whether one of said steps completed independently of others of said steps. The method includes determining whether the sequence started, determining whether the sequence completed, and determining whether a sequence fault occurred.

23 Claims, 6 Drawing Sheets

METHOD FOR CENTRALIZATION OF PROCESS SEQUENCE CHECKING

FIELD OF THE INVENTION

The present invention relates to process sequence checking, and more particularly to methods for centralization of process sequence checking.

BACKGROUND OF THE INVENTION

In a process, such as control system software, a series of steps are performed in a defined order or sequence. Verifying whether the steps in the sequence are performed in the defined order is known as sequence checking. Sequence checking is essential to ensure that the process or the control system operates properly. To facilitate sequence checking, a control system is generally divided into subsystems.

In a traditional method of sequence checking, the operation of each step by a subsystem depends on the status of the previous step and the subsystem that executes that step. For example, as shown in FIG. 1, subsystem 2 will not perform a step if subsystem 1 has either not performed or erroneously performed a step. This dependency of performance of one step on the performance of another step complicates modification and expansion of the control system because modifying or adding a step in a sequence requires modification of other steps. Additionally, the traditional method uses resources, such as computer memory and throughput, inefficiently.

SUMMARY OF THE INVENTION

Accordingly, the present invention provides a method for centralization of process sequence checking comprising defining a set of steps in a sequence for a process, defining an order of steps in said set of steps, determining whether one of said steps started independently of others of said steps, determining whether one of said steps completed independently of others of said steps, determining whether the sequence started, determining whether the sequence completed, and determining whether a sequence fault occurred.

In another feature, the method comprises registering one of said steps as step started when said step is started.

In another feature, the method comprises registering one of said steps as step completed when said step is completed and incrementing a step count.

In still another feature, the method comprises registering the sequence as completed when all said steps in the sequence are completed.

In another feature, the method comprises registering one of said steps as a sequence error when said step is not started, registering one of said steps as a sequence error when said step is not completed, and registering one of said steps as a sequence error when said step is not in the order.

In another feature, the method comprises registering a sequence fault when said sequence error occurs, registering a sequence fault when the sequence has not started, and registering a sequence fault when the sequence has not completed.

In yet another feature, the method comprises incrementing a sequence fault count when said sequence fault is detected.

In still another feature, the method comprises comparing said sequence fault count to a predetermined threshold.

In still another feature, the method comprises storing said sequence fault and registering a process failure when said sequence fault count exceeds said predetermined threshold.

In another feature, the method comprises determining a next expected step in the sequence when the sequence is not completed.

In another feature, the method comprises determining whether said next expected step is one of start type and complete type.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
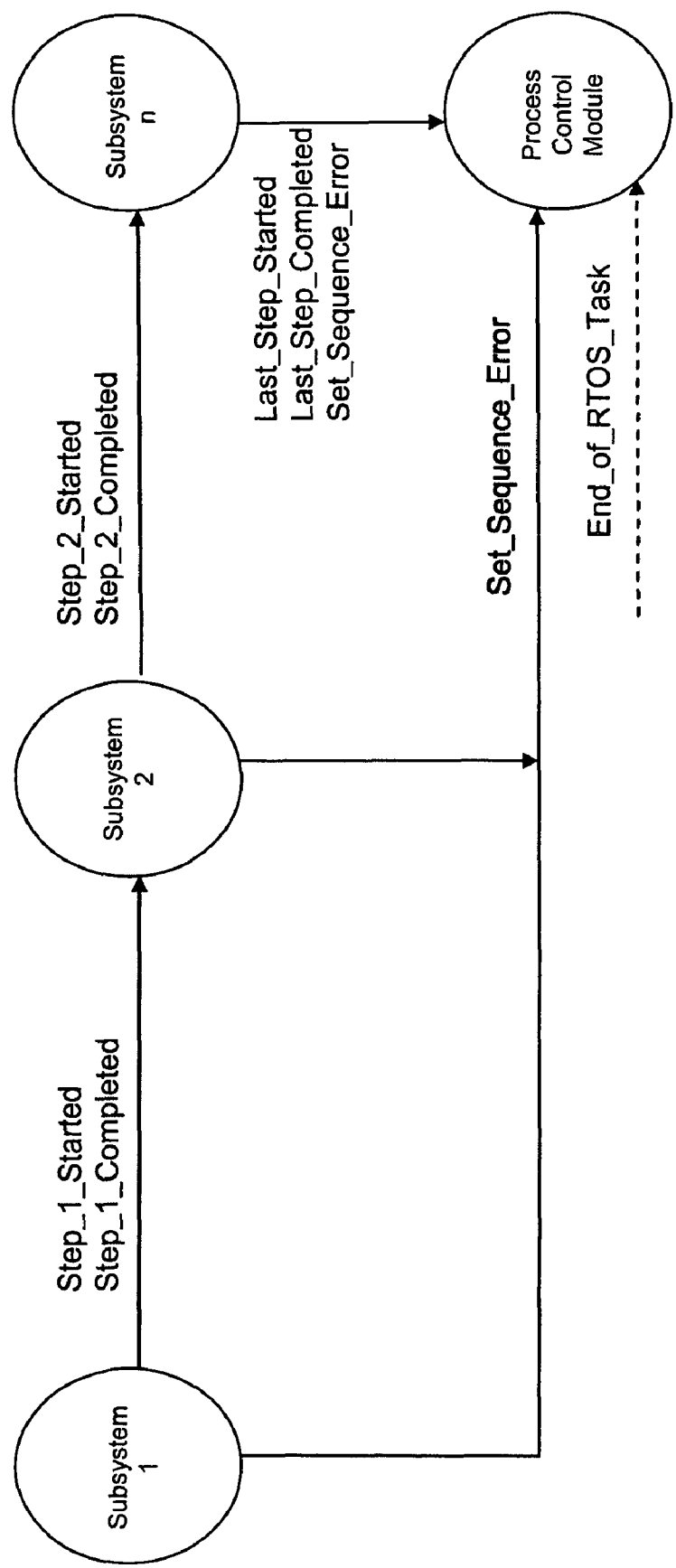
FIG. 1 illustrates an exemplary traditional method of process sequence checking.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and other suitable components that provide the described functionality.

Figure 2:
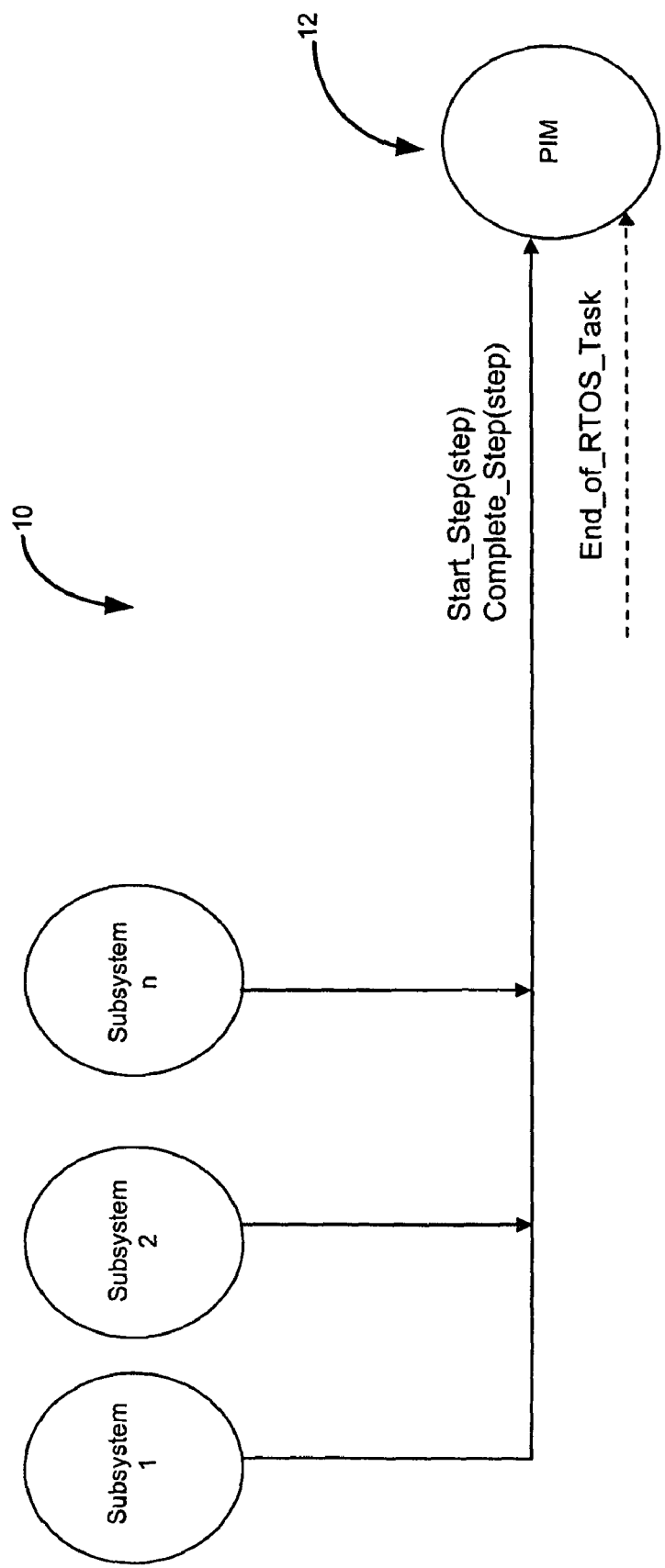
FIG. 2 illustrates an exemplary method for centralization of process sequence checking according to the present invention.

Referring now to FIG. 2, a method for centralization of process sequence checking is shown. A process or a control system 10 is divided into multiple subsystems. A process integrity module (PIM) 12 defines a sequence of steps for the process. If the process requires more than one sequence, the sequences are defined independently of one another, that is, the sequences do not share steps. The PIM provides interfaces, or standardized service routines (not shown), that report to the PIM the status of the sequence and the status of any step independently of other steps in the sequence. For example, a step-start routine reports a step and the status of the step when a subsystem starts a step. Similarly, a step-complete routine reports a step and the status of the step when a subsystem completes a step. If the reported step is not in the order that is predefined in the sequence, a sequence fault is detected, and the reported step is saved as a sequence error.

Notably, the method 10 controls neither the order of execution nor the execution of the steps in a sequence. Instead, the method checks independently of other steps whether any step executed by a subsystem is in the defined order within the sequence. More specifically, the method reports independently of other steps the status of any step as step started, step completed, step skipped, step repeated etc.

The PIM 12 performs a sequence test by executing a sequence test service routine at the end of a real time operating system task (RTOS), or a sequence. The sequence test detects whether a sequence fault occurred. A sequence fault occurs if a step is skipped, repeated, not in the correct order, etc., and if the sequence has not started or finished. If the sequence has completed without a fault, a fault counter (not shown) is cleared. Otherwise, a fault counter is incremented and compared to a predetermined threshold. If the threshold is exceeded, the fault is latched, or logged, and a process integrity failure is reported so that the control system may take remedial action.

Additionally, based on the reported status of a step, the sequence test routine tracks the next expected step type (i.e., start or complete) and the next expected step in the sequence to check. Thus, the sequence test provides a method to define and verify proper operation of a sequence.

Figure 3:
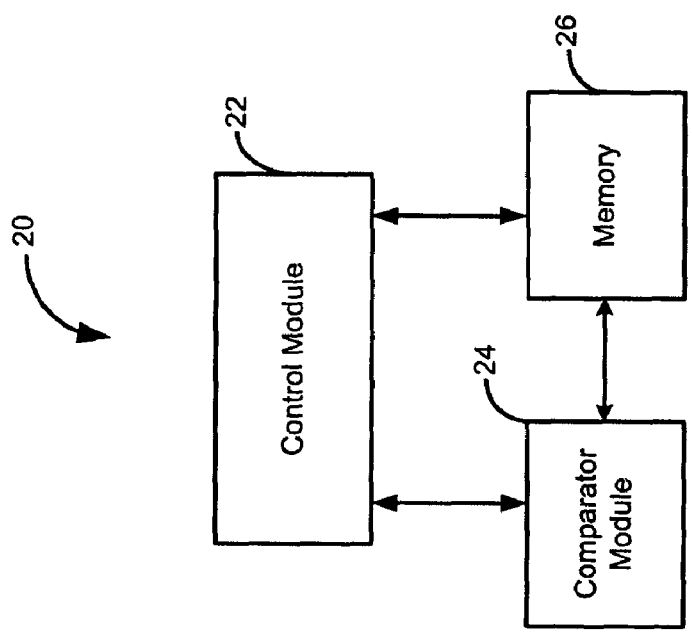
FIG. 3 is a functional block diagram of an exemplary system for centralization of process sequence checking according to the present invention.

Referring now to FIG. 3, a system 20 for centralization of process sequence checking is shown. A control module 22 utilizes a comparator module 24 and memory 26 and executes standardized service routines to test independently of other steps the status of a step and a sequence. When a step is started or completed, the control module 22 saves the step as step started or step completed respectively in the memory 26. The comparator module 24 checks whether a step has started or completed in the correct order. If the comparator module 24 detects that the step does not match the expected step or step type (i.e., start or complete), a fault is detected, and the step is saved as a sequence error in the memory 26.

At the end of the operating system task, or sequence, the control module 22 executes a sequence-test service routine that detects errors such as step missed, step repeated, step not in the correct order, sequence not started or completed etc. If the comparator module 24 determines that a sequence has completed without a fault, a fault counter is cleared in the memory 26. Otherwise, the fault counter is incremented, and the comparator module 24 compares the fault count with a predetermined threshold stored in the memory 26. If the fault count exceeds the threshold, the sequence fault is latched or logged in the memory 26 and a process integrity failure is reported so that the system may take remedial action. Based on the reported steps, the sequence-test service routine provides the next expected step type (i.e., start or complete) and the next expected step in a sequence to test.

Figure 4:
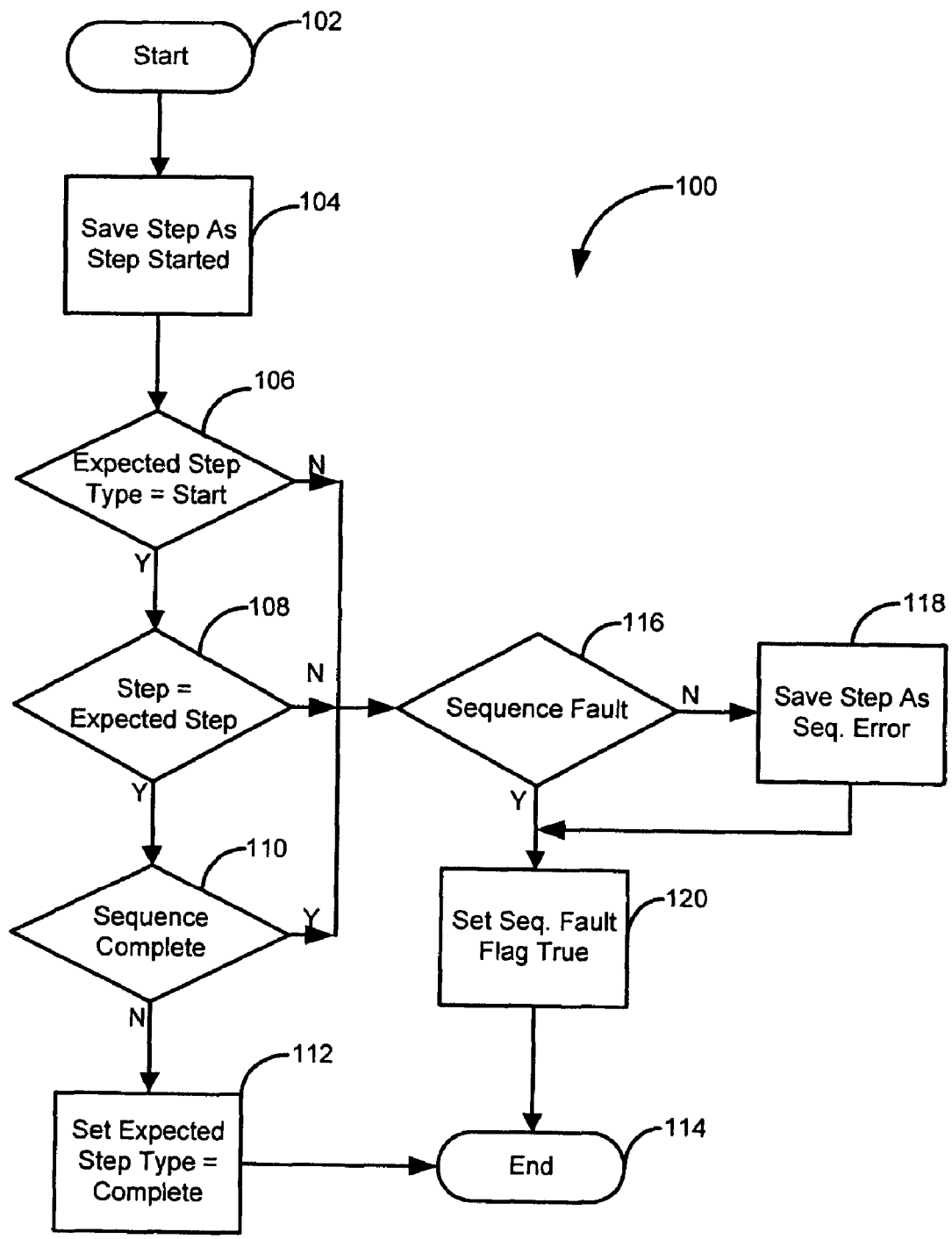
FIG. 4 is a flow-chart illustrating an exemplary algorithm for a step-start service routine according to the present invention.

Referring now to FIG. 4, an algorithm 100 for a step-start service routine is shown. A control module 22 starts the algorithm at step 102. In step 104, a reported step in a sequence is saved as step started in a memory 26. Then a comparator module 24 checks if three conditions occurred: (1) in step 106, whether the reported step is in the correct order and matches the expected step type (i.e. start); (2) in step 108, whether the reported step is in the correct order and matches the expected step; and (3) in step 110, whether the sequence is incomplete.

If all three conditions occurred, then in step 112, the next expected step type is set to "complete," and the service routine ends in step 114. If, however, any of the three conditions did not occur, then in step 116, the comparator module 24 checks if a sequence fault occurred by checking a sequence fault flag in the memory 26. If the flag is false or reset (i.e. no sequence fault occurred), then in step 118, the reported step is saved as a sequence error in the memory 26; in step 120, the sequence fault flag is set true (i.e. a sequence fault occurred); and the routine ends in step 114. If, however, in step 116, a sequence fault is detected (i.e. the flag is set true in the memory 26), then in step 120, the sequence fault flag is left unchanged, and the routine ends in step 114.

Figure 5:
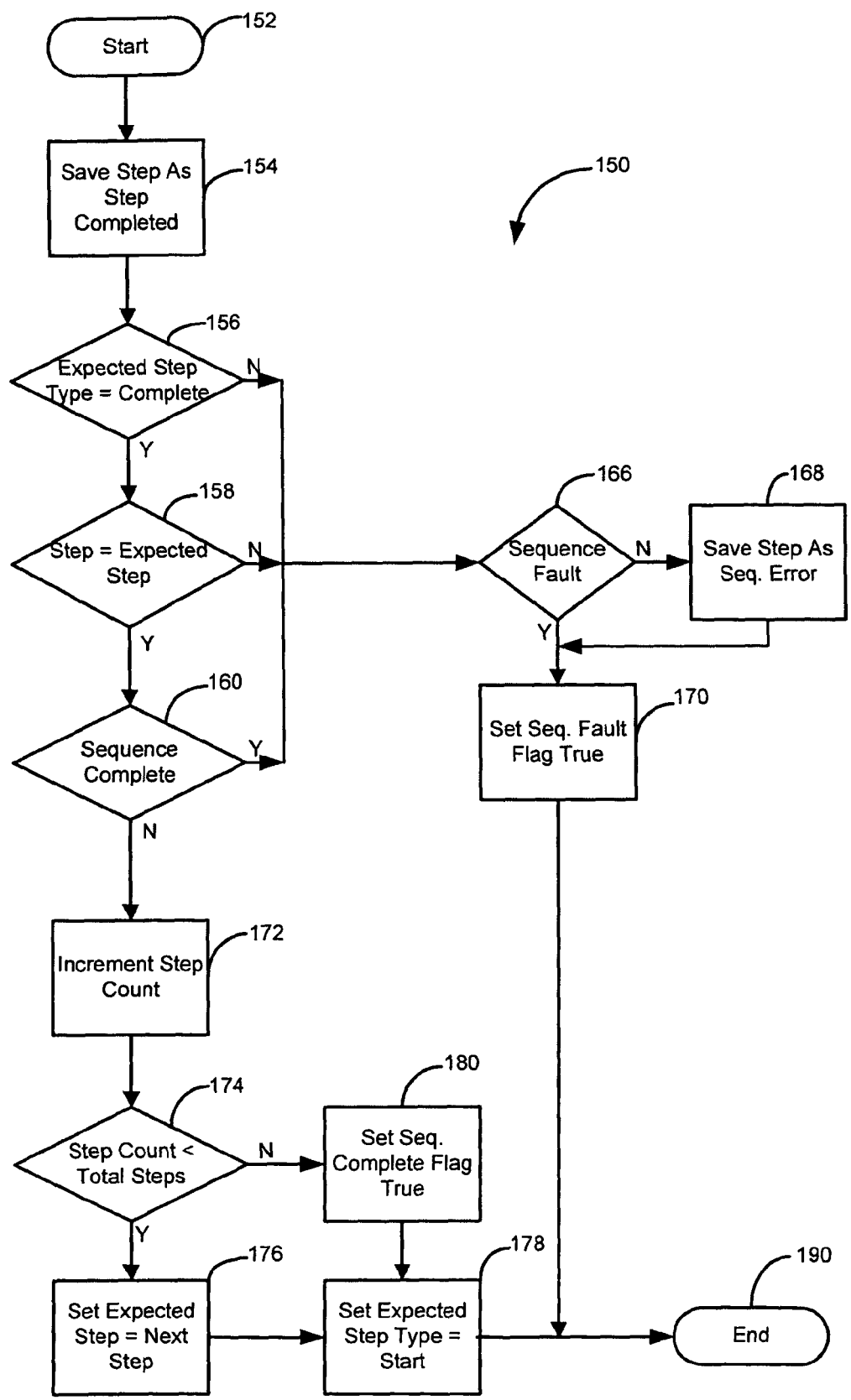
FIG. 5 is a flow-chart illustrating an exemplary algorithm for a step-complete service routine according to the present invention.

Referring now to FIG. 5, an algorithm 150 for a step-complete service routine is shown. A control module 22 starts the algorithm at step 152. In step 154, a reported step is saved as step completed in memory 26. Then a comparator module 24 checks if three conditions occurred: (1) in step 156, whether the reported step is in the correct order and matches the expected step type (i.e. complete); (2) in step 158, whether the reported step is in the correct order and matches the expected step; and (3) in step 160, whether the sequence is incomplete.

If any of the three conditions do not occur, then in step 166, the comparator module 24 checks if a sequence fault occurred by checking a sequence fault flag in the memory 26. If the flag is false or reset (i.e. no sequence fault occurred), then in step 168, the reported step is saved as a sequence error in memory 26; in step 170, the sequence fault flag is set true (i.e. a sequence fault occurred); and the routine ends in step 180. If, however, in step 166, a sequence fault is detected (i.e. the flag is set true in the memory 26), then in step 170, the sequence fault flag is left unchanged, and the routine ends in step 190.

On the other hand, if any of the three conditions in steps 156, 158, and 160 did not occur, then in step 172, a step counter in the memory 26 is incremented. In step 174, the comparator module 24 compares the step count with the total number of steps in a sequence. If the step count is less than the total number of steps in a sequence, then in step 176, the expected step is set to the next step in the sequence; in step 178, the expected step type is set to "start;" and the service routine ends in step 190. If, however, in step 174, the step count is not less than the total number of steps, then in step 180, a sequence complete flag is set true in the memory 26, and the service routine ends in step 190.

Figure 6:
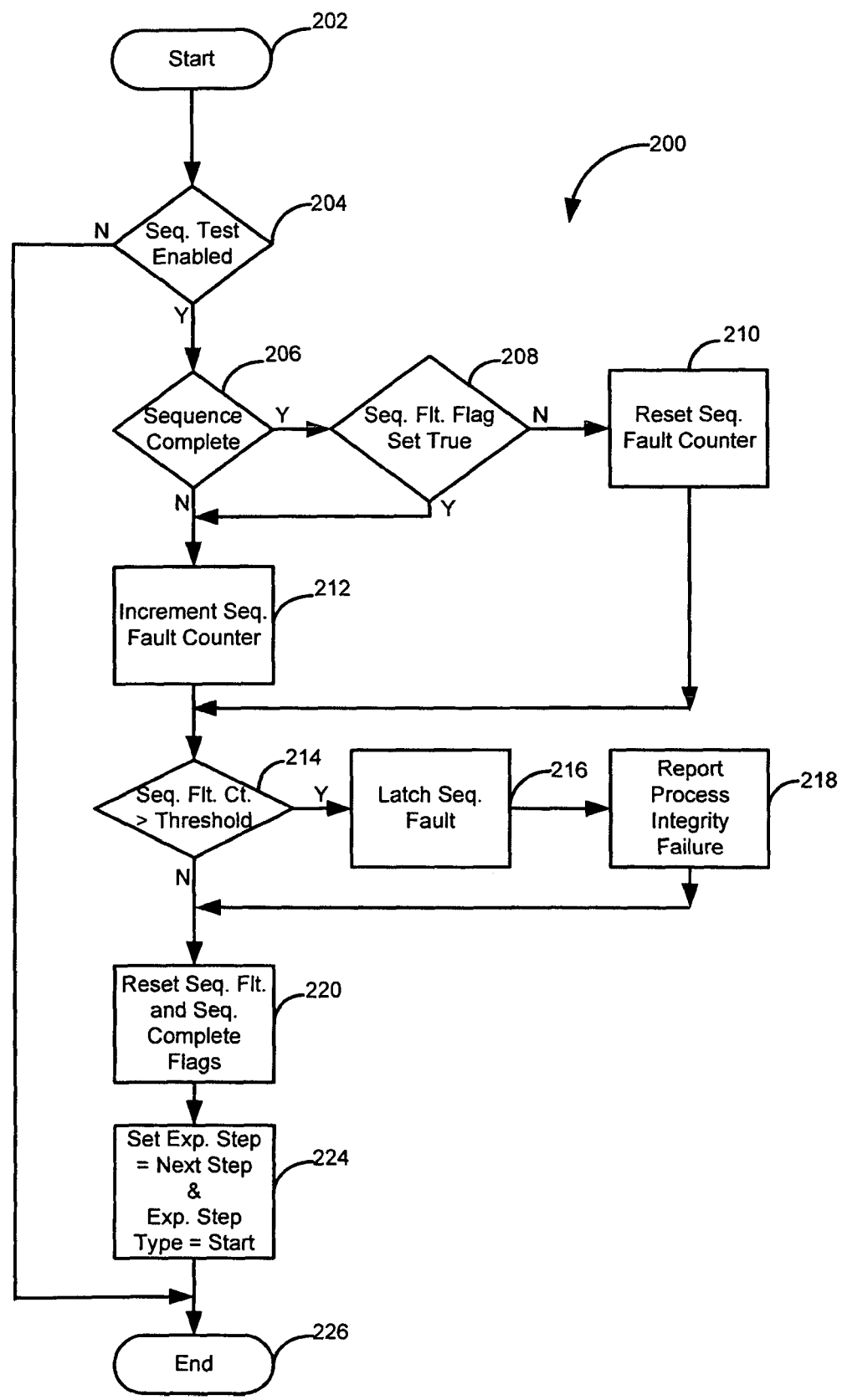
FIG. 6 is a flow-chart illustrating an exemplary algorithm for a sequence-test service routine according to the present invention.

Referring now to FIG. 6, an algorithm 200 for a sequence-test service routine is shown. A control module 22 starts the routine at step 202. In step 204, a comparator module 24 checks whether a sequence test enabled flag is set true in the memory 26. If the flag is reset or false, then the service routine ends in step 226. If, however, the flag is set true, then in step 206, the comparator module 24 checks if a sequence has completed.

If the sequence has completed, that is, if the sequence complete flag is set true in the memory 26, then in step 208, the comparator module 24 checks if a sequence fault occurred, that is, if a sequence fault flag is set true in the memory 26. If no sequence fault occurred, then in step 210, a sequence fault counter in the memory 26 is reset. If, however, a sequence has not completed or a sequence fault occurred, then in step 212, the sequence fault counter in the memory 26 is incremented.

In step 214, the comparator module 24 compares the sequence fault count with a predetermined threshold. If the fault count exceeds the threshold, then in step 216, the sequence fault is latched or logged in the memory 26, and in step 218, a process integrity failure is reported so that a remedial action may be taken. If, however, the fault count does not exceed the threshold, then in step 220, the sequence fault flag and the sequence complete flag are cleared in the memory 26; in step 224, the expected step is set to the first step and the expected step type is set to "start" in the memory 26; and the service routine ends in step 226.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A method for centralization of process sequence checking, comprising:
defining a set of steps in a sequence for a process;
defining an order of steps in said set of steps;
determining whether said sequence started;
determining whether one of said steps started independently of others of said steps;
determining whether one of said steps completed independently of others of said steps;
determining independently of others of said steps a status of one of said steps as step started, step completed, step skipped, step repeated, or step not in order;
determining, based on said status, (i) a next expected step in said sequence and (ii) whether a next expected step type is one of start type and complete type;
determining whether said sequence completed; and
determining, when said sequence is completed, whether a sequence fault occurred depending on whether one of said steps is not in correct order, does not match an expected step, or does not match an expected step type.

2. The method of claim 1 further comprising registering one of said steps as step started when said step is started.

3. The method of claim 1 further comprising registering one of said steps as step completed when said step is completed and incrementing a step count.

4. The method of claim 1 further comprising registering said sequence as completed when all said steps in said sequence are completed.

5. The method of claim 1 further comprising:
registering one of said steps as a sequence error when said step is not started;
registering one of said steps as a sequence error when said step is not completed; or
registering one of said steps as a sequence error when said step is not in said order.

6. The method of claim 5 further comprising:
registering a sequence fault when said sequence error occurs;
registering a sequence fault when said sequence has not started; or
registering a sequence fault when said sequence has not completed.

7. The method of claim 1 further comprising incrementing a sequence fault count when said sequence fault is detected.

8. The method of claim 7 further comprising comparing said sequence fault count to a predetermined threshold.

9. The method of claim 8 further comprising:
storing said sequence fault; and
registering a process failure when said sequence fault count exceeds said predetermined threshold.

10. A system for centralization of process sequence checking, comprising:
memory that stores a set of steps and an order of said steps in a sequence for a process;
a control module that determines independently of others of said steps in said sequence whether one of said steps started and whether one of said steps completed; that determines independently of others of said steps a status of one of said steps as step started, step completed, step skipped, step repeated, or step not in order; and that determines, based on said status, (i) a next expected step in said sequence and (ii) whether a next expected step type is one of start type and complete type; and
a comparator module that determines whether said steps in said sequence are completed, and that determines, when said steps in said sequence are completed, whether a sequence fault occurred depending on whether one of said steps is not in correct order, does not match an expected step, or does not match an expected step type.

11. The system of claim 10 wherein said control module stores one of said steps in said memory as step started when said step is started.

12. The system of claim 10 wherein said control module stores one of said steps in said memory as step completed when said step is completed and increments a step count stored in said memory.

13. The system of claim 10 wherein said control module sets a sequence complete flag in said memory when said comparator module determines that said steps in the sequence are completed.

14. The system of claim 10 wherein said control module stores one of said steps in said memory as a sequence error when said step is not started.

15. The system of claim 10 wherein said control module stores one of said steps in said memory as a sequence error when said step is not completed.

16. The system of claim 10 wherein said control module stores one of said steps in said memory as a sequence error when said step is not in said order.

17. The system of claim 10 wherein said comparator module detects a sequence fault when a sequence error occurs, and said control module sets true a sequence fault flag in the memory.

18. The system of claim 10 wherein said comparator module detects said sequence fault when the sequence has not started, and said control module sets true a sequence fault flag in said memory.

19. The system of claim 10 wherein said comparator module detects said sequence fault when said sequence has not completed, and said control module sets true a sequence fault flag in said memory.

20. The system of claim 10 wherein the control module increments a sequence fault count when said comparator module detects said sequence fault.

21. The system of claim 20 wherein said comparator module compares said sequence fault count to a predetermined threshold stored in said memory.

22. The system of claim 10 wherein said control module stores said sequence fault in said memory and registers a process failure in said memory when a sequence fault count exceeds a predetermined threshold.

23. The system of claim 10 wherein said control module comprises said memory and said comparator module.

* * * * *